Oct. 5, 1965 F. SCHAEFER ETAL 3,210,409
PROCESSES FOR THE CONTINUOUS PRODUCTION OF DITHIOCARBAMATES
Filed Sept. 19, 1961
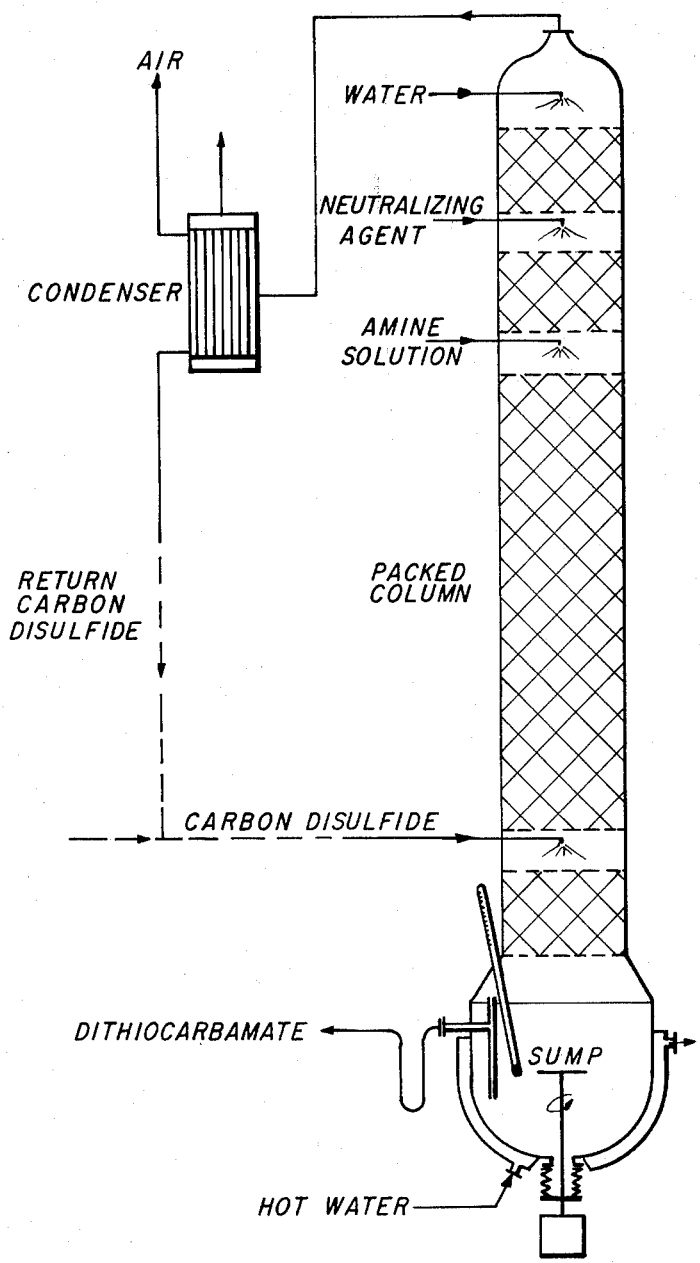
INVENTORS:
FRIEDBERT SCHAEFER, FRIEDRICH SCHMIDT.
BY Connolly and Hutz
their ATTORNEYS

United States Patent Office 3,210,409
Patented Oct. 5, 1965

3,210,409
PROCESS FOR THE CONTINUOUS PRODUCTION OF DITHIOCARBAMATES
Friedbert Schaefer, Wuppertal-Vohwinkel, and Friedrich Schmidt, Wuppertal-Elberfeld, Germany, assignors to Farbenfabriken Bayer Aktiengesellschaft, Leverkusen, Germany, a corporation of Germany
Filed Sept. 19, 1961, Ser. No. 139,105
Claims priority, application Germany, Sept. 21, 1960, F 32,217
4 Claims. (Cl. 260—500)

The invention relates to a simple process for the continuous production of solutions of dithiocarbamates.

It is known to react dialkyl amines with carbon disulfide in the presence of an alkali-metal hydroxide solution in the liquid phase to obtain solutions of dithiocarbamates. In these processes, the reaction is carried out with vigorous stirring in a reaction vessel at temperatures below 20° C. However, this process has a number of disadvantages. If it is desired to conduct the process continuously, it is necessary to use a plurality of vessels arranged in cascade form. However, this represents a very high expenditure for apparatus and the use of long reaction times. In addition, the solutions which are obtained always contain carbon disulfide, which cannot be easily removed from the solutions and results in a serious danger of explosion during the further processing. On account of the considerable heat of reaction, it is necessary to cool with brine in order to reach the required low temperatures. Because of the low reaction temperatures, the conversion proceeds slowly and generally several hours are required.

It is an object of the present invention to provide a simple process for the continuous production of solutions of dithiocarbamates. Another object is the provision of solutions of dithiocarbamates practically free from carbon disulfide. Yet another object is the provision of a process which can be carried out on an industrial scale. An additional object is to provide a process in which high throughput velocities are produced with a low expenditure as regards equipment. Other objects will be apparent from the following description and the examples.

It has been found that solutions of dithiocarbamates are obtained in a very simple manner by reacting carbon disulfide with amines if the solution of an amine and if necessary simultaneously the solution of one or more bases intended for neutralization purposes are introduced into carbon disulfide in vapor form at least at the boiling temperature of the latter and the resultant solution of the dithiocarbamate is removed from the reaction chamber.

The reaction is preferably carried out in a packed column, carbon disulfide vaporizing or distilling in the lower part. The amine solution and if necessary the solution of the additional base intended for neutralization purposes are introduced into the ascending vapor and the resulting salt solution is extracted from the sump of the column.

There is a considerable prejudice against working with carbon disulfide in vapor form, since carbon disulfide is highly explosive. It was surprising that when working in accordance with the invention in spite of the relatively low temperature such high reaction velocities are obtained that the reaction can be carried out in the vapor phase in a very small space. Thus, it is no longer dangerous in practice to work with carbon disulfide in vapor form. The reaction space is reduced in size approximately in the ratio of 40:1 by comparison with the known process. These data are related to equal throughputs. All mechanically moving parts which generate uncontrollable heat of friction are particularly dangerous when working with carbon disulfide, since the flash point of the latter is as low as −30° C. and its ignition temperature is 102° C. The process according to the invention dispenses entirely with the use of all mechanically moving parts, such as stirrer devices, in the reaction chamber. With the prior known process, however, it was necessary to stir vigorously in order that the liquid phases be mixed as thoroughly as possible. The process of the invention is consequently less dangerous than the known processes.

Preferably to be considered as amines are primary and secondary monoamines and diamines, which contain hydrocarbon radicals, such as aryl, alkyl or cycloalkyl radicals. However, heterocyclic amines can also be employed. The hydrocarbon radicals generally have not more than 6 carbon atoms.

Dimethylamine and diethyl amine are mentioned as examples of monoamines with a low alkyl radical, and ethylene diamine as an example of diamines.

If diamines are used, both amine groups react and alkylene bisdithiocarbamic acid compounds are formed which contain two dithiocarbamoyl radicals.

The amines are dissolved in water or organic, inert solvents, such as alcohols and halogenated hydrocarbons, but it is advantageous to employ water.

For the neutralization of the dithiocarbamic acids, there are generally used tertiary amines, such as trimethyl amine or triethyl amines, but advantageously alkali-metal hydroxides. It is possible to dispense with the addition of these neutralizing bases entirely if the amine to be reacted is introduced in a suitable excess. The amine then acts simultaneously as a salt-forming agent.

The bases intended for the neutralization are dissolved in water or inert organic solvents before being supplied to the reaction chamber. Alcohols and halogenated hydrocarbons are examples of suitable organic solvents.

The solutions of the amines and also the bases intended for the neutralization thereof can even be prepared in the reaction chamber itself. For this purpose, the basic substances are introduced in liquid form, simultaneously with a suitable solvent.

The reaction takes place at temperatures between the boiling point of the carbon disulfide and about 160° C., advantageously between 46° and 100° C. If the reaction takes place in a packed column, these temperatures are related to the reaction chamber. The other parts of the column can be at different temperatures.

The substances are preferably reacted at normal pressure, but it can also be advantageous in certain cases to use an excess pressure up to about 6 atmospheres.

When carrying out the process according to the invention, between one and two mols of carbon disulfide are used for each mol of amino radical of the amine. The excess carbon disulfide is distilled off. One mol of the neutralizing agent is used per mol of amino radical of the amine. Each amino radical forms a dithiocarbamic acid radical, which must be neutralized. Quantities which as far as possible are exactly stoichiometric are used with the addition of the salt-forming agents.

As already mentioned, a corresponding excess of the amine to be reacted can also be added as neutralizing agent.

The amine content of the amine solutions is arbitrary in practice and it is advantageously between 20 and 60% by weight. The neutralizing agents are likewise introduced in solutions and it is advantageous to use 10% to 50% solutions for this purpose. Water can also be introduced into the reaction chamber to control the concentration of the solutions and the temperature in the reaction chamber. The reaction is so strongly exothermic that the liberated heat is sufficient for maintaining the reaction temperature. The temperature in the sump of the reaction chamber is higher than the boiling temperature of the carbon disulfide. As a result, solutions of dithiocarbamates are obtained which are completely free from carbon disulfide. The reaction solutions are withdrawn from the sump.

The reaction according to the invention is advantageously carried out in a packed column, such as is shown in the attached drawing. Carbon disulfide is introduced into the lower part of the packed column, and is evaporated therein. The amine solution and if desired the solution of a neutralizing agent and water are introduced into the ascending vapor. The reaction takes place in the space of the column between the points of introduction of the carbon disulfide and the amine solution. The excess carbon disulfide passes through the top of the column and is condensed in the condenser with the air-venting device. The returned carbon disulfide is introduced together with fresh carbon disulfide into the column. The sump of the column has a temperature higher than the boiling temperature of the carbon disulfide.

The solution of dithiocarbamate accumulating as reaction product is drawn off from the sump. The latter can be heated by hot water, this being desirable when starting up the column.

The process of the invention shows important advantages. The dithiocarbamate solutions which are obtained are free from carbon disulfide and consequently can be handled without danger. The process of the invention permits a large tolerance in the proportioning accuracy. By slight over-proportioning by about 5% of carbon disulfide, the dithiocarbamate solution is practically free from reactive amine. In this way, a maximum yield is guranteed. Cooling with brine and also supplementary heating are not necessary. The conversion speeds are very high. The expenditure for equipment, related to the throughput, remains low. In addition, it is not necessary to have any mechanically moving parts in the reaction space. It is only necessary to avoid delays in boiling in the sump. The sump liquid can also be stirred from below, this being completely safe since the mechanically moving parts are in a solution which is free from carbon disulfide.

The dithiocarbamate solutions can be used directly for the production of vulcanization accelerators and plant-protection agents. Sparingly soluble salts can also be precipitated directly from the aqueous solutions according to the invention, which salts can be used in plant-protection.

*Example 1*

Preparation of an aqueous solution of sodium dimethyldithiocarbamate.

In accordance with a stoichiometric ratio, 10.29 liters per hour (l./h.) of carbon disulfide, 19.50 l./h. of 45.4% dimethyl amine, 18.25 l./h. of 28.5% sodium hydroxide solution and 43.0 l./h. of water are introduced into and reacted in a packed column (970 x 60 mm. diameter) which is filled with 10 mm. glass Raschig rings and equipped with a column sump with a capacity of 5 litres and having a Vibro mixer. Analysis of the solution conformed to a content of 24.29% of sodium dimethyldithiocarbamate, 1.67% of free amine, 0.0% of free sodium hydroxide and 0.0% of carbon disulfide. Yield: 96.5% of the theoretical.

In a supplementary experiment in which carbon disulfide was supplied in an excess of 75%, the analysis showed a content of 24.8% of sodium dimethyldithiocarbamate, 0.4% of free amine, 0.0% of free sodium hydroxide and 0.0% of carbon disulfide. Yield: 98.4% of the theoretical.

Temperature in the column sump: 51° C., temperature in the column: 53° C.

*Example 2*

Preparation of an aqueous solution of sodium ethylene-bis-dithiocarbamate.

587 grams per hour (g./h.) of carbon disulfide, 270 g./h. of 77.8% ethylene diamine, 1010 g./h. of 25% sodium hydroxide solution, 88.4 g./h. of 22% ammoniacal liquor and 1050 g./h. of water were introduced into and reacted in a packed column (830 x 38 mm. diameter) with a 2-litre stirrer-type flask as a sump, the lower half (380 mm.) was filled with 4 mm. Raschig rings consisting of stainless steel wire gauze and the upper half with 2 mm. Raschig rings of the same material. Analysis showed the solution to contain 23.45% of sodium ethylene bis-dithiocarbamate, 1.09% of free ethylene diamine, 0.47% of free ammonia, 0.0% of free sodium hydroxide and 0.0% of carbon disulfide. Yield: 84.3% of the theoretical. Temperature in the column sump: 65° C., temperature at head of column: 46° C.

We claim:

1. A process for the continuous production of an aqueous solution of a salt of a dithiocarbamic acid which comprises continuously charging at a temperature between 46° and about 100° C. and a pressure between 1 and 6 atmospheres into a packed column provided with a sump reservoir
   (i) an aqueous solution of an amine of the group consisting of hydrocarbon primary and secondary monoamines and diamines containing up to 6 carbon atoms at an upper portion of the packed column,
   (ii) an aqueous solution of a base of the group consisting of alkali metal hydroxides and tertiary alkylamines at an upper portion of the packed column, and
   (iii) vapors of carbon disulfide at a lower portion of the packed column, in such proportions that a molecular ratio of carbon disulfide to each amino radical of the amine between 1:1 and 2:1 is maintained in the system and continuously recovering the resulting aqueous solution of the salt of the dithiocarbamic acid from the sump reservoir.

2. A process for the continuous production of an aqueous solution of a salt of a dithiocarbamic acid which comprises continuously charging at a temperature between 46° and about 100° C. and at a pressure between 1 and 6 atmospheres into a packed column provided with a sump reservoir
   (i) an aqueous solution containing between 20 and 60 percent by weight of an amine of the group consisting of diethylamine, dimethylamine, and ethylene diamine at an upper portion of the said column,
   (ii) an aqueous solution containing between 10 and 50 percent by weight of a base of the group consisting of alkali-metal hydroxides and tertiary alkyl amines, at an upper portion of the packed column, and
   (iii) carbon disulfide in vapor form at a lower portion of the pocked column, each at such a rate that a molecular ratio of carbon disulfide to amino radicals of the amine to neutralization equivalent of the base is between 1:1:1 and 2:1:1 is maintained in the packed column, and continuously recovering the resulting aqueous solution of the salt of the dithiocarbamic acid from the sump reservoir.

3. A process for the continuous production of an aqueous solution of sodium dimethyldithiocarbamate which comprises continuously charging at a temperature between 46° and about 100° C. and at a pressure between 1 and 6 atmospheres into a packed column provided with a sump reservoir
   (i) an aqueous solution containing between 20 and 60 percent by weight of dimethylamine at an upper portion of the packed column,
   (ii) an aqueous solution containing between 10 and 50 percent by weight of sodium hydroxide at an upper portion of the packed column, and
   (iii) carbon disulfide in vapor form at a lower portion of the packed column, each at such a rate that a molecular ratio of carbon disulfide to dimethylamine to sodium hydroxide between 1:1:1 and 2:1:1 is maintained in the packed column, and continuously recovering the resulting aqueous solution of sodium dimethyldithiocarbamate from the sump reservoir.

4. A process for the continuous production of an aqueous solution of an amine salt of a dithiocarbamic acid which comprises continuously charging at a temperature between about 46° and about 100° C. and a pressure between 1 and 6 atmospheres into a packed column provided with a sump reservoir,
  (i) an aqueous solution of an amine of the group consisting of hydrocarbon primary and secondary monoamines and diamines containing up to 6 carbon atoms at an upper portion of the packed column, and
  (ii) vapors of carbon disulfide at a lower portion of the packed column, in such proportions that a stoichiometrical excess of the amine to the carbon disulfide is maintained in the system and continuously recovering the aqueous solution of the salt of the dithiocarbamic acid from the sump reservoir.

References Cited by the Examiner

UNITED STATES PATENTS

| | | | |
|---|---|---|---|
| 2,693,485 | 11/54 | Cobeil | 260—500 |
| 3,061,637 | 10/62 | Martinek | 260—534 |

FOREIGN PATENTS 387,924   2/33   Great Britain.

OTHER REFERENCES

Houben-Weyl: "Methoden der Org. Chem.," vol. 8, p. 111 (1952).

Houben-Weyl: "Methoden der Organischen Chemie," vol. 9, pp. 824–827 (1955).

LEON ZITVER, *Primary Examiner.*

CHARLES B. PARKER, *Examiner.*